July 3, 1928.

C. G. FISHER 1,675,847

ELECTRIC SWITCH ATTACHMENT

Filed Sept. 30, 1924

CARL G. FISHER
INVENTOR

BY John P. Mironow
ATTORNEY

Patented July 3, 1928.

1,675,847

UNITED STATES PATENT OFFICE.

CARL G. FISHER, OF PORT WASHINGTON, NEW YORK.

ELECTRIC SWITCH ATTACHMENT.

Application filed September 30, 1924. Serial No. 740,777.

My invention relates to electric switch attachments and has a particular reference to attachment of switches controlling electric lights, ignition, warning signals etc. on automobiles and the like.

The object of my invention is to provide an electric switch attachment directly on the steering wheel within reach of the driver's fingers, so that he could operate the switches without losing his grip of the wheel.

I am aware that switches have been invented for mounting on top of the steering post, but such switches cannot move with the wheel, and in order to operate them the driver must remove one hand from the wheel or he must otherwise loosen his grip of the wheel. With my switch arrangement however, the driver can use both his hands for steering, using only one of his fingers to operate any of the switches,—for instance, dimming the headlights or pressing the electric horn button.

In order to maintain an uninterrupted electrical connection between my switches and the rest of the electrical equipment, I provide a flexible lead or cable between the steering wheel and the stationary steering post, placing the cable in the form of several loops in a special housing and providing a spring arrangement to keep these loops under certain tension so as to avoid any irregular bunching or crowding of the cable in the housing.

My invention is more fully described in the accompanying specification and drawing in which—

Figure 1:
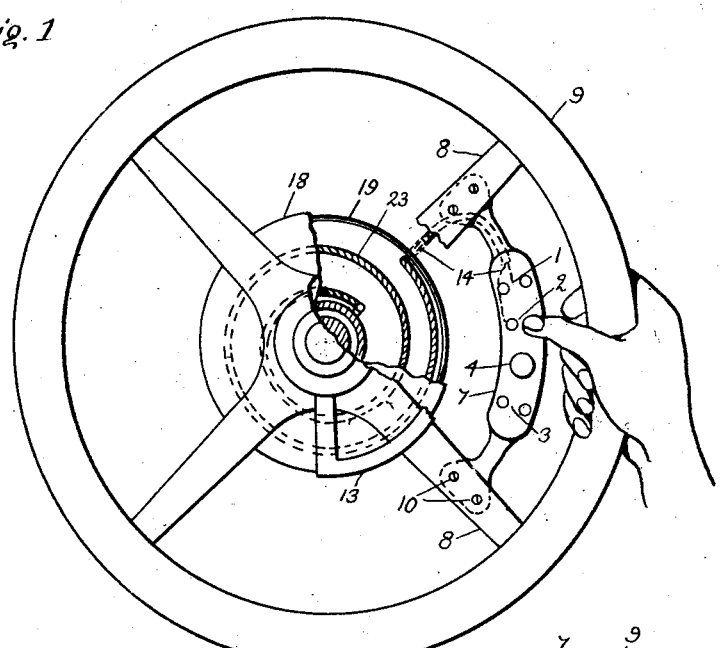
Figure 2:
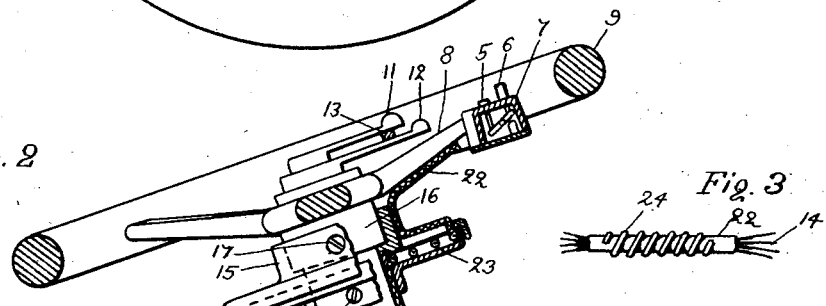
Figure 3:
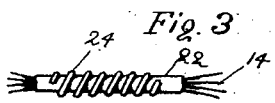
Figure 5:
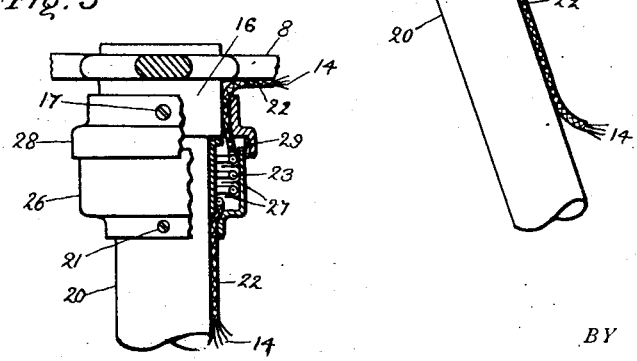
Figure 4:
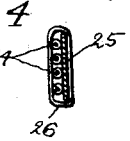

Fig. 1 is a plan view of the steering wheel with my switch, showing also the cable loops in the housing partly in section, Fig. 2 is an elevation of same partly in section, Fig. 3 is a detailed view of the cable with the spring outside, Fig. 4 is another arrangement of the cable and the spring, and Fig. 5 is a sectional elevation of a modified housing with the spring cable.

My electric switch actually represents an aggregate of switches 1, 2 and 3, also of push buttons 4 (the latter usually for operating electric horns on automobiles). One of these switches is usually connected with main headlights, the other with dimmed lights and with a tail lamp, and one with the ignition circuit. These switches may be of any standard form or make, one of the convenient forms being shown in Figs. 1 and 2. Each switch contains two push buttons 5 and 6 so interconnected, that when one button is pushed down, the other automatically moves up. For instance, by pushing right buttons or plungers 6 the circuits are closed, and by pressing down the left buttons 5 the circuits are opened.

All these switches are mounted in a housing 7 formed integrally with spokes 8 of the steering wheel 9 or attached with screws 10. The housing 7 is made and arranged so that it does not interfere with the driver's hand holding the rim of the wheel, also it does not interfere with ordinary spark and throttle controlling levers 11 and 12 which are movable on a sector 13. This is accomplished by giving the housing substantially concentric shape with the rim of the wheel and providing a clearance for the driver's fingers, bringing it at the same time close enough to the driver's hand so that he can operate any of the switches or push buttons by simply extending his thumb, as shown in Fig. 1, without releasing or changing his grip of the wheel, and retaining his control of the particular switch while turning the wheel.

The leads 14 from the respective switches are brought through arms of the housing 7 along one of the spokes of the wheel 9 and down over a sleeve 15 attached to the hub 16 of the wheel 9 with screws 17. This sleeve has an enlarged bell shaped portion 18, partly covering but not touching a stationary cable housing 19 attached to the steering post 20 with screws 21. The cable or conduit 22, containing leads 14, is brought inside of the cable housing 19 near its periphery through the top cover 18. The cable is placed inside of the housing 19 in loosely wound loops 23 and brought down through an aperture in the housing 19, being fastened alongside of the steering column 20 and extended back of the instrument board (not shown) to be connected with leads to electric devices controlled by the switches described.

In operation of this device the loops 23 allow sufficient freedom of rotation for the wheel 9 within requirements of the steering gear construction. On ordinary automobiles the steering wheel makes from one and a half to two turns between extreme left and right position of the front wheels.

Therefore the loops 23 must allow at least one turn for the wheel either way from its neutral or straight ahead position.

This is accomplished by making sufficient number of loops 23 and having a sufficiently large difference in diameters of the cable housing 19 near its periphery and near its central portion, so that there must be a difference of at least two turns between two extreme positions of the cable inside of the housing: when it is all crowded towards periphery of the housing, and when it is wound tight around the central portion. The length of each turn at the periphery being greater, it follows that there will be fewer number of turns of cable when it is crowded towards the outer or peripheral portion of the housing.

The cable should be arranged so that for a neutral position of the wheel, with the wheels pointing straight ahead, the loops should be partly wound around the central portion, winding tighter with the wheel being turned in one direction, and unwinding with the wheel being turned in the other direction.

For a satisfactory operation of this device it is necessary to prevent the cable from crowding or bunching in one place in the housing, and this may be accomplished best by enclosing the cable in a spiral spring 24 (Fig. 3). The spring will tend to force the cable outward in the housing thereby keeping this cable constantly under a tension and preventing any looseness between the loops 23.

In order to reduce the diameter of the cable housing it is useful to make the cable flat (Fig. 4) by placing all individual leads 14 in a row and placing them at the side of a flat spring 25, covering all with a durable and flexible material 26, wound around or braided.

A modified arrangement is shown in Fig. 5. Here the cable loops 23 are placed in the form of a helical spring in an elongated housing 26 attached to the steering post 20 with screws 21. Separators 27 may be attached to the walls of the housing in order to keep the successive loops apart. These separators may be made in the form of flat rings or sectors and they should not reach all way to the central portion of the housing.

The bell shaped cover 28 protects the cable and the housing from dust and moisture. An additional protection may be obtained by introducing a layer of felt 29 or other similar dust proofing material between the housing and the cover. The cable in this case is also enclosed in a spiral spring 24 inside of the housing.

Important advantages of my switch mechanism are that the switches may be operated by the driver without his loosening his grip of the wheel, which is very important for the safety in driving, for instance, when the driver must dim his lights when passing another motorist on a narrow road, or when he must blow his electric horn when people or other vehicles suddenly appear in his path.

I claim as my invention:

In an electric switch attachment, the combination with a cylindrical housing, of a flexible cable spirally coiled in said housing, the outer wall of said housing extending above said cable, said housing being provided with an aperture for a steering post of an automobile, a bushing extending downward from said housing around said aperture and slidably fitting said post, means to attach said bushing to said post, one end of said cable extending from said housing down through said bushing, a cover for said housing, the outer wall of said cover extending outside of said outer wall of said housing, said cover being provided with an aperture for the hub of a steering wheel, a bushing extending from said cover around said aperture and adapted to fit said hub, means to attach said bushing to said hub, said cover being adapted to rotate with said wheel without touching said housing, the other end of said cable extending through said cover to said hub and to said wheel to electrical switches on said wheel, and means to render said cable resilient inside of said housing.

Signed at Port Washington, in the county of Nassau and State of New York, this 22 day of Sept. A. D. 1924.

CARL G. FISHER.